United States Patent
Wang et al.

(10) Patent No.: US 10,227,471 B2
(45) Date of Patent: Mar. 12, 2019

(54) DEGRADABLE EXTRUSION RESISTANT COMPOSITIONS AND ARTICLES OF MANUFACTURE

(71) Applicants: Xiao Wang, Houston, TX (US); Ping Duan, Cypress, TX (US); Anil K. Sadana, Houston, TX (US)

(72) Inventors: Xiao Wang, Houston, TX (US); Ping Duan, Cypress, TX (US); Anil K. Sadana, Houston, TX (US)

(73) Assignee: BAKER HUGHES, A GE COMPANY, LLC, Houston, TX (US)

( * ) Notice: Subject to any disclaimer, the term of this patent is extended or adjusted under 35 U.S.C. 154(b) by 101 days.

(21) Appl. No.: 15/211,661

(22) Filed: Jul. 15, 2016

(65) Prior Publication Data
US 2018/0016411 A1  Jan. 18, 2018

(51) Int. Cl.
| | |
|---|---|
| *C08K 3/30* | (2006.01) |
| *C08G 18/10* | (2006.01) |
| *C08G 18/42* | (2006.01) |
| *C08G 18/76* | (2006.01) |
| *E21B 33/12* | (2006.01) |
| *E21B 34/06* | (2006.01) |

(52) U.S. Cl.
CPC ............. *C08K 3/30* (2013.01); *C08G 18/10* (2013.01); *C08G 18/42* (2013.01); *C08G 18/7621* (2013.01); *E21B 33/12* (2013.01); *E21B 34/06* (2013.01); *C08K 2201/005* (2013.01)

(58) Field of Classification Search
None
See application file for complete search history.

(56) References Cited

U.S. PATENT DOCUMENTS

| | | | | |
|---|---|---|---|---|
| 2007/0288979 | A1* | 12/2007 | Yen | G06Q 30/02 725/114 |
| 2008/0262613 | A1* | 10/2008 | Gogolewski | A61L 26/0019 623/11.11 |
| 2013/0240201 | A1 | 9/2013 | Frazier | |
| 2015/0198008 | A1 | 7/2015 | Smith et al. | |
| 2016/0177655 | A1 | 6/2016 | Fripp et al. | |
| 2017/0016298 | A1* | 1/2017 | Takahashi | C08K 5/0016 |
| 2017/0204697 | A1* | 7/2017 | Fripp | E21B 33/1208 |

FOREIGN PATENT DOCUMENTS

| | | |
|---|---|---|
| CA | 2941718 A1 | 9/2015 |
| WO | 2015098801 A1 | 7/2015 |
| WO | 2017095536 A1 | 6/2017 |

OTHER PUBLICATIONS

International Search Report, International Application No. PCT/US2017/037672, dated Sep. 12, 2017, Korean Patent Office, International Search Report 4 pages.
International Written Opinion, International Application No. PCT/US2017/037672, dated Sep. 12, 2017, Korean Patent Office, International Written Opinion 10 pages.
Valerio, et al. "Degradable polyurethane nanoparticles containing vegetable oils", European Journal of Lipid Science and Technology, Jan. 2014, vol. 116; 8 pages.

* cited by examiner

*Primary Examiner* — Robert T Butcher

(74) *Attorney, Agent, or Firm* — Cantor Colburn LLP

(57) ABSTRACT

A degradable polymer composite comprises a polyurethane comprising one or more of the following groups: ester groups; carbonate groups; or ether groups, in a backbone of the polyurethane; and about 1 to about 30 parts by weight of an acidic or basic powder comprising particles having an average size of about 5 microns to about 1 millimeter per 100 parts of the polyurethane.

17 Claims, 3 Drawing Sheets

DEGRADABLE EXTRUSION RESISTANT COMPOSITIONS AND ARTICLES OF MANUFACTURE

BACKGROUND

Downhole constructions including oil and natural gas wells, $CO_2$ sequestration boreholes, etc. often utilize borehole components or tools that, due to their function, are only required to have limited service lives that are considerably less than the service life of the well. After a component or tool service function is complete, it must be removed or disposed of in order to recover the original size of the fluid pathway for uses such as hydrocarbon production and $CO_2$ sequestration. Disposal of components or tools can be accomplished by milling or drilling the component or by tripping the tool out of the borehole. Each of these is generally time consuming and expensive. The industry would be receptive to new materials, and methods that remove a component or tool from a borehole without such milling and drilling operations.

BRIEF DESCRIPTION

In an embodiment, a degradable polymer composite comprises a polyurethane comprising one or more of the following groups: ester groups; carbonate groups; or ether groups, in a backbone of the polyurethane; and about 1 to about 30 parts by weight of an acidic or basic powder comprising particles having an average size of about 5 microns to about 1 millimeter per 100 parts of the polyurethane.

An article comprising the degradable polymer composite is also disclosed.

A method of manufacturing a degradable article comprises compressing a combination of an acidic or basic powder comprising particles having an average size of about 5 microns to about 1 millimeter and a polyurethane forming composition at a temperature of about 20° C. to about 150° C. and a pressure of about 100 psi to about 10,000 to provide a molded part; and heating the molded part at a temperature of about 60° C. to about 150° C. to provide the disintegrable article; wherein the polyurethane forming composition comprises a first composition comprising a polyol and a polyisocyanate, at least one of the polyisocyanate and the polyol comprising one or more of the following groups: ester groups; carbonate groups; or ether groups; or a second composition comprising a curative and a polyurethane prepolymer comprising one or more of the following groups: ester groups; carbonate groups; or ether groups.

A method to degrade an article comprises exposing an article to a fluid at a temperature of about 25° C. to about 300° C., the article comprising a polyurethane comprising one or more of the following groups: ester groups; carbonate groups; or ether groups, in a backbone of the polyurethane; and about 1 to about 30 parts by weight of an acidic or basic powder comprising particles having an average size of about 5 microns to about 1 millimeter per 100 parts of the polyurethane.

BRIEF DESCRIPTION OF THE DRAWINGS

The following descriptions should not be considered limiting in any way. With reference to the accompanying drawings, like elements are numbered alike.

DETAILED DESCRIPTION

Figure 1:
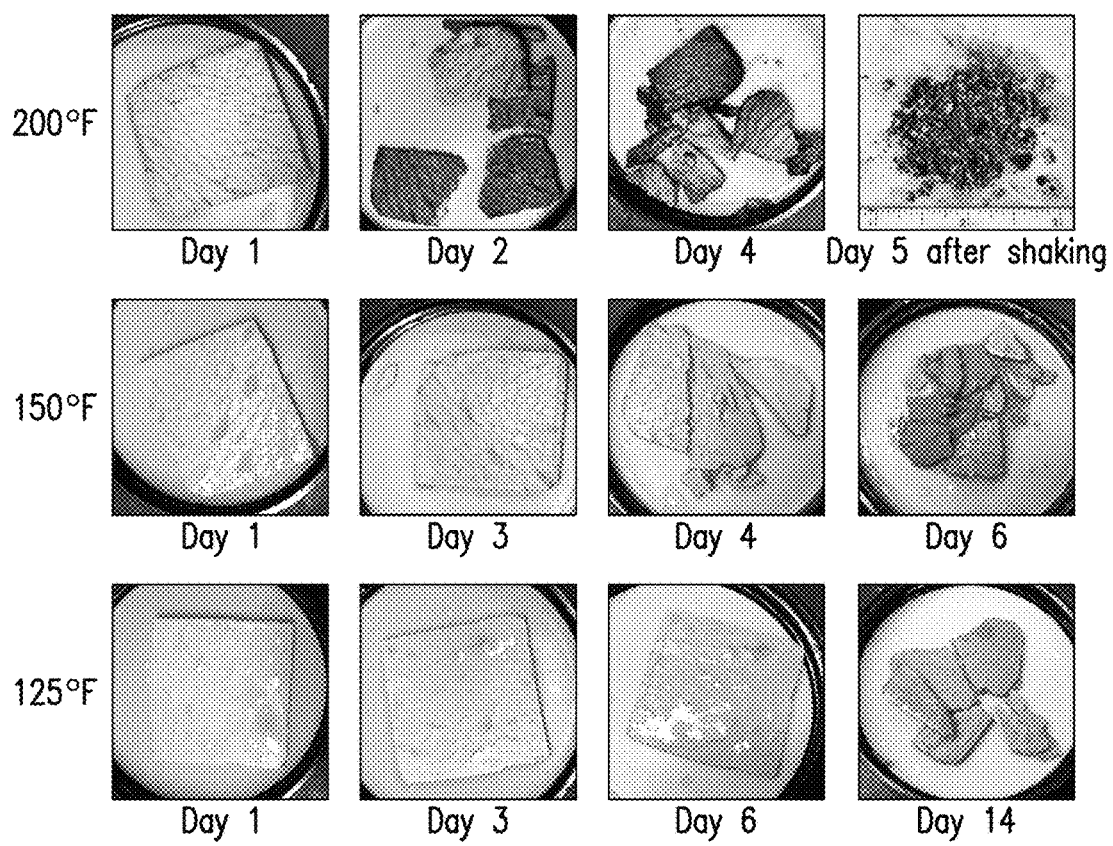
FIG. 1 illustrates the degradation property of the degradable polyurethane composite of example 1.

Disclosed herein are degradable polymer composites and articles that may be used in a wide variety of applications and environments, including use in various subterranean environments to make selectively and controllably disposable or degradable tools or other components. These polymer composites and articles include a polyurethane and an acidic or basic powder comprising particles having an average size of about 5 microns to about 1 millimeter. The polyurethane comprises ester groups, carbonate groups, ether groups, or a combination thereof on a backbone of the polyurethane.

The polymer composites and articles provide a unique and advantageous combination of high extrusion resistance, high tensile strength, excellent elongation, and rapid and controlled disintegration in various fluids comprising water or brine at elevated temperatures. Conventional polyurethanes having ester groups may degrade at temperatures greater than 200° F. However, the degradation may take more than a month; and the degradation products contain solids, which may not be easily removed. In addition, conventional polyurethanes may not have the extrusion resistance desired for certain applications. Advantageously, the polymer composites of the disclosure can degrade at lower temperatures, for example at a temperature equal to or less than 200° F. within two weeks, which makes the composites or articles comprising the composites suitable for use in low temperature wells. In addition, the tools or articles comprising the polymer composites have high extrusion resistance, and can maintain their geometry with acceptable but degrading mechanical properties until they are no longer needed.

The polyurethane component in the degradable polymer composites comprises one or more of ester groups, carbonate groups, or ether groups in a backbone of the polyurethane. The ester groups are specifically mentioned. Suitable ester groups include linear ester groups or cyclic ester groups such as caprolactone. As used herein, a backbone of the polyurethane refers to a main chain of the polyurethane comprising covalently bounded atoms that together create a continuous polymer chain of the molecule. Although other functional groups such as carboxylic groups can be attached to the backbone of the polyurethane, in an embodiment, no other functional groups such as carboxylic acid groups are attached to the backbone of the polyurethane.

The polyurethane can be derived from a polyurethane forming composition comprising a polyisocyanate and a polyol, wherein at least one of the polyisocyanate and the polyol comprise ester groups, carbonate groups, ether groups or a combination comprising at least one of the foregoing. Alternatively or in addition, the polyurethane forming composition comprises a polyurethane prepolymer and a curative, wherein the polyurethane prepolymer has ester groups, carbonate groups, ether groups, or a combination comprising at least one of the foregoing.

The polyisocyanate may be one or more of any of a number of polyisocyanates that are known for applications in the production of polyurethanes. Exemplary polyisocyanates include, but are not limited to aromatic polyisocyanates, such as diphenylmethane diisocyanate (MDI, e.g., 4,4'-MDI, blends of 4,4'-MDI and 2,4'-MDI), MDI prepolymer, and modified polymeric MDI containing monomeric MDI, toluene diisocyanate (TDI), p-phenylene diisocyanate (PPDI), naphthalene diisocyanate (NDI), and o-tolidine diisocyanate (TODI), as well as aliphatic polyisocyanates such as 1,6-hexamethylene diisocyanate (HDI), isophorone diisocyanate (IPDI), tetramethylxylene diisocyanate (TMXDI), and cyclohexane diisocyanate (CHDI). Mixtures of any of the aforementioned polyisocyanates or other known polyisocyanates may also be used. In an exemplary embodiment, the polyisocyanate is a modified MDI (e.g., MONDUR PC sold by Bayer) or MDI prepolymer (e.g., LUPRANATE 5040 sold by BASF). The polyisocyanate can contain ester groups, carbonate groups, ether groups, or a combination comprising at least one of the foregoing.

The polyol portion may include, but not necessarily be limited to, polyether polyols (e.g., prepared by reaction of ethylene oxide and/or propylene oxide with polyol initiators such as propylene glycol, glycerine, sorbitol, or sucrose, to name a few), polyester polyols (e.g., prepared by polyesterification of low molecular weight polyacids such as malonic acid, succinic acid, adipic acid, carballylic acid with low molecular weight polyols such as propylene glycol, 1,4-butane diol, and the like, and also polycaprolactone polyols), polycarbonate polyols, polybutadiene polyols, and the like.

In an exemplary embodiment, ester linkages in the backbone of the polyurethane are incorporated by including a polyester polyol in the reaction mixture. In a further exemplary embodiment, a polyester polyol in a polyurethane reaction mixture may have a molecular weight of from 1000 to 2000 and an OH number of from 50 to 130. Exemplary polyester polyols include, but are not limited to FOMREZ 45, FOMREZ 1023-63, FOMREZ 1066-187, and FOMREZ 1066-560 from Chemtura.

Alternatively or in addition, the polyurethane material may also be formed by reacting polyurethane prepolymers and curatives. Polyurethane prepolymers are formed by reacting polyols with diisocyanates. In an embodiment, the polyurethane prepolymers have reactive isocyanate end groups and are formed by reacting a stoichiometric excess of a diisocyanate as described herein with a polyol as described herein. These polyurethane prepolymers are generally stable in a closed container, but reactive when they are contacted with chemicals such as water, diols, diamines, etc., forming high molecular polymers. In an embodiment, the polyurethane prepolymer is a TDI-based polyester containing reactive isocyanate end groups. Polyurethane prepolymers are commercially available from companies such as Bayer Corporation or BASF or Chemtura Corporation.

The polyurethane prepolymers containing isocyanate ended reactive groups can react with curatives including diols such as 1,4-butanediol, 1,3-propanediol, hydroquinone bis (beta-hydroxyethyl) ether (HQEE), or di-amines such as 4,4-methylene bis (2-chloroaniline) "MOCA", 1,3 Propanediol bis-(4-aminobenzoate), diethyltoluenediamine, dimethylthiotoulenediamine. In an embodiment the polyurethane prepolymer containing isocyanate ended reactive groups is used in combination with a polyisocyanate as described herein to further adjust the degradation properties of the polymer composition.

Polyurethane forming compositions may also include small amounts of chain-extenders (low molecular weight diols or diamines) such as 1,4-butanediol, 1,3-propanediol, ethylene glycol, propylene glycol, ethanolamine, or diethyltoluenediamine, or dimethylthiotoluenediamine (DMTDA). Other suitable chain extenders include but are not limited to 4,4'-Methylene bis (2-chloroaniline), "MOCA", sold by Chemtura under the commercial name VIBRA-CURE A 133 HS, and trimethylene glycol di-p-aminobenzoate, "MCDEA", sold by Air Products under the commercial name VERSALINK 740M. The polyurethane forming composition may also include cross-linkers (low molecular weight polyfunctional alcohols or amines) such as trimethylol propane (TMP), triethanolamine (TEA), or N,N, N',N'-tetrakis(2-hydroxypropyl) ethylenediamine. Catalysts, such as amine catalysts (e.g., tertiary amines such as triethylenediamine), organometallic catalysts, trimerization catalysts (e.g., 1,3,5-(tris(3-dimethylamino)propyl)-hexahydros-triazine) may also be included in the reaction mixture.

In a non-restrictive embodiment, the polyurethane forming composition comprises a TDI-terminated polyester prepolymer such as ADIPRENE 1950A from Chemtura Corporation; a curative such as 1,3-propanediol bis-(4-aminobenzoate).

The amount of polyisocyanate and/or the polyurethane prepolymer used in the polyurethane-forming composition can vary, depending upon the particular application for which the polyurethane is being prepared. In general, the total —NCO equivalents to total active hydroxyl equivalents is such as to provide a ratio of 0.8 to 1.2 equivalents of —NCO per equivalent of active hydroxyl groups, and preferably a ratio of about 1.0 to 1.08 equivalents of —NCO per active hydroxyl. The active hydroxyl groups can be provided by polyols, cross linking agents, chain extenders, or a combination comprising at least one of the foregoing.

The acidic or basic powders include organic or inorganic materials. In an embodiment, the powder is dissolvable. In another embodiment, the powder is not dissolvable. As used herein, a material is dissolvable means that the material is soluble in water or reacts with water and/or the polyurethane to form compounds that are soluble in water. A compound is soluble if it dissolves in water to provide a solution with a concentration of at least 0.1 moles per liter at room temperature for example at 23° C. Exemplary acidic powder includes one or more of the following: citric acid; succinic acid; 2-acrylamide-2-methylpropane sulfonic acid; lignosulfonic acid; sulfamic acid; or adipic acid. Exemplary basic powder includes one or more of the following: calcium oxide; calcium hydroxide; aluminum hydroxide; aluminum oxide; or glass powder.

Glass powders such as dissolvable silicates are generally not distinct stoichiometric chemical substances. The dissolvable silicate can comprise about 55 to about 80 wt. % of $SiO_2$, 0 to about 35 wt. % of $Na_2O$, 0 to about 35 wt. % of $K_2O$, 0 to about 20 wt. % of CaO, and 0 to about 10 wt. % of MgO, provided that the sum of the weights of $Na_2O$ and $K_2O$ is about 20 wt. % to about 40 wt. %, about 20 wt. % to about 35 wt. %, or about 22 wt. % to about 33 wt. %, wherein each weight percent is based on the total weight of the dissolvable silicates. The general formula for dissolvable alkali silicates is $M_2OxSiO_2$, where M is Na, K, or Li, and x is the molar ratio defining the number of moles silica ($SiO_2$) per mole of alkali metal oxide ($M_2O$). In an embodiment, the dissolvable silicates comprise at least one of sodium silicate or potassium silicate. Preferably the dissolvable silicates comprise sodium silicate having a formula of $Na_2O.SiO_2$, wherein the weight percent of $SiO_2$ relative to $Na_2O$ is about 3.22:1 to about 1:1, about 3.22:1 to about 2.5:1, specifically about 2:1 to about 1:1.

In an embodiment, the powder comprises particles having an average particle size of about 5 microns to about 1 millimeter, about 5 microns to about 500 microns, about 10 microns to about 200 microns, or about 30 microns to about 200 microns. Particle size can be determined by an appropriate method of sizing particles such as, for example, static or dynamic light scattering (SLS or DLS) using a laser light source. Without wishing to be bound by theory, it is believed that when the powder particles are within these size ranges the polymer composites have optimized degradation rate for subterranean applications.

The amounts of the polyurethane and the acidic or basic powder can be adjusted to balance the degradation rate and the desirable physical properties of the composites. Generally, polymer composites having a lower polymer/acidic or basic powder ratio are likely to have a higher degradation rate and a higher mechanical strength. However, the presence of large amounts of acidic or basic powders can make the polymer composites too brittle to be useful for certain applications. In an embodiment, the weight ratio of the polymer component relative to the acidic or basic powder in the polymer composite is about 50:1 to about 1:1, about 20:1 to about 2:1, or about 10:1 to about 5:1. In an embodiment, the acidic or basic powder is present in an amount of about 1 to about 30 parts by weight per 100 parts by weight of the polyurethane. In another embodiment, the acidic or basic powder is present in an amount of about 5 to about 20 parts by weight per 100 parts by weight of the polyurethane.

The polymer composites are useful for producing degradable articles. A method of manufacturing the degradable article comprises: compressing a combination of an acidic or basic powder comprising particles having an average size of about 5 microns to about 1 millimeter and a polyurethane forming composition at a temperature of about 20° C. to about 150° C. and a pressure of about 100 psi to about 10,000 to provide a molded part; and heating the molded part at a temperature of about 60° C. to about 150° C. to provide the disintegrable article; wherein the polyurethane forming composition comprises a first composition comprising a polyol and a polyisocyanate, at least one of the polyisocyanate and the polyol comprising one or more of the following groups: ester groups; carbonate groups; or ether groups; or a second composition comprising a curative and a polyurethane prepolymer comprising one or more of the following groups: ester groups; carbonate groups; or ether groups.

Conventional polyurethane parts are generally made by casting. However, the parts made by casting methods from a combination of an acidic or basic powder and a polyurethane forming composition can have undesirable voids. Under the process conditions disclosed herein, the articles are substantially free of voids, for example, the articles can contain less than about 5 volume percent of voids, less than about 2 volume percent of voids, less than 1 volume percent of voids, or less than 0.5 volume percent of voids, each based on the total volume of the degradable article.

The obtained articles can be further machined or shaped to form a bar, block, tubular, cylindrical billet, or toroid. Machining includes cutting, sawing, ablating, milling, facing, lathing, boring, and the like using, for example, a miller, saw, lathe, router, electric discharge machine, and the like. Alternatively, the polymer composites can be directly molded to the useful shape by choosing the molds having the desired shape.

In an embodiment, the polymer composites are used to produce articles that can be used as tools or implements, e.g., in a subterranean environment. Exemplary tools include flappers, hold down dogs and springs, screen protectors, seal bore protectors, electric submersible pump space out subs, full bore guns, chemical encapsulations, slips, dogs, springs and collet restraints, liner setting sleeves, timing actuation devices, emergency grapple release, chemical encapsulation containers, screen protectors, beaded screen protectors, whipstock lugs, whipstock coatings, pins, set screws, emergency release tools, gas generators, mandrels, release mechanisms, staging collars, C-rings, components of perforating gun systems, disintegrable whipstock for casing exit tools, shear pins, dissolvable body locking rings, mud motor stators, progressive cavity pump stators, or shear screws.

The article can be a downhole tool. In an embodiment, the tool is a single component. In another embodiment the tool inhibits flow. In yet another embodiment, the tool is pumpable within a subterranean environment.

Pumpable tools include plugs, direct connect plugs, bridge plugs, wiper plugs, frac plugs, components of frac plugs, drill in sand control beaded screen plugs, inflow control device plugs, polymeric plugs, disappearing wiper plugs, cementing plugs, balls, diverter balls, shifting and setting balls, swabbing element protectors, buoyant recorders, pumpable collets, float shoes, or darts.

The tools that inhibit flow include seals, high pressure beaded frac screen plugs, screen basepipe plugs, coatings for balls and seats, compression packing elements, expandable packing elements, O-rings, attached seals, bullet seals, sub-surface safety valve seals, sub-surface safety valve flapper seal, dynamic seals, V-rings, back up rings, drill bit seals, liner port plugs, atmospheric discs, atmospheric chamber discs, debris barriers, drill in stim liner plugs, inflow control device plugs, flappers, seats, ball seats, direct connect disks, drill-in linear disks, gas lift valve plug, fluid loss control flappers, electric submersible pump seals, shear out plugs, flapper valves, gaslift valves, or sleeves.

The polymer composites are useful for producing degradable articles. In an embodiment, the polymer composites or articles comprising the polymer composites degrade at a temperature of equal to or lower than about 200° F. in a fluid in less than or equal to about 15 days, in less than or equal to about 10 days, in less than or equal to about 8 days, or in less than or equal to about 5 days. Advantageously, the polymer composites or articles comprising the degradable polyurethane composites break into pieces having a largest dimension of less than about two centimeters or less than about one centimeter in about 2 days to about 2 weeks at a temperature of about 100° F. to about 200° C. in water. The polymer composites or articles comprising the degradable polyurethane composites can also break into pieces having a largest dimension of less than two centimeters or less than about one centimeter in about 4 days to about 10 days at a temperature of about 120° F. to about 175° C. in water.

Articles comprising the degradable polyurethane composites or the composites themselves can have excellent extrusion resistance. In an embodiment, the article or the composite has a tensile strength of about 3000 psi to about 8000 psi or about 4000 psi to about 600 psi or about 5000 psi measured according to ASTM D412.

The polyurethane composites and the articles comprising the same can have excellent elasticity. In an embodiment, the composites and the articles comprising the same can have an elongation of greater than about 300%.

Methods to degrade a polyurethane polymer composite or an article comprising the polymer composite comprises: exposing the polymer composite or the article to a fluid at a temperature of about 25° C. to about 300° C., about 65° C. to about 250° C., or about 65° C. to about 150° C. or about 175° C. to about 250° C. The pressure can be about 100 psi to about 15,000 psi.

The fluid can comprises water, brine, or a combination comprising at least one of the foregoing. The brine can include NaCl, KCl, NaBr, $MgCl_2$, $CaCl_2$, $CaBr_2$, $ZnBr_2$, $NH_4Cl$, sodium formate, cesium formate, and the like.

Example 1

A degradable polyurethane composite was prepared from a polyurethane pre-polymer, curative and acidic fine powder. A toluene diisocyanate (TDI)-terminated polyester-based polyurethane pre-polymer (ADIPRENE 1950A from Chemtura Corporation having NCO content as 5.45%, 120 grams) was pre-heated at 70° C. to form a low viscosity liquid. An aromatic diamine (1,3 propanediol bis-(4-aminobenzoate), VIBRACURE A157, 23.21 grams) was pre-heated at 130° C. to form a liquid. The diamine was added into the pre-polymer and mixed for 10 seconds. After a sulfamic acid fine powder (14.3 grams) was added and mixed for 1 min, the mixture was poured into a mold for compression molding. A void-free molded part was obtained after curing in the mold at an elevated temperature.

Degradation Property

The degradation property of degradable composite was illustrated in FIG. 1. As shown in FIG. 1, the composite degraded into small pieces in water at a temperature range of 200~125° F. within 2 weeks.

Tensile Property

Figure 2:
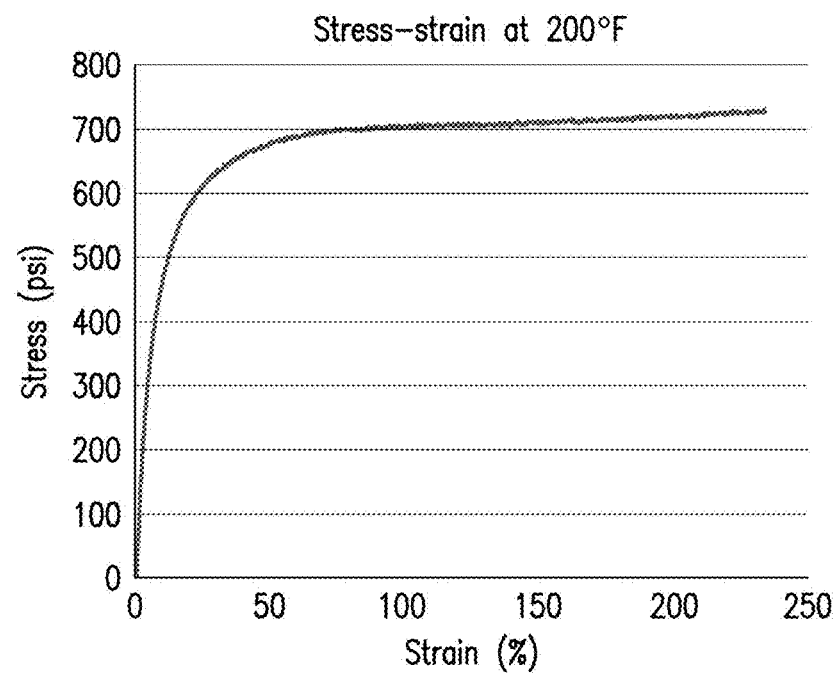
FIG. 2 shows the stress-strain curve of the degradable polyurethane composite of example 1.

High elongation is critical for sealing large borehole due to folding and twisting of the elastomer during setting. The stress-strain curve of the degradable polyurethane composite is shown in FIG. 2. As shown in FIG. 2, the elongation of the degradable polyurethane composite can reach over 300% at the application temperature (room temperature to 200° F.). Due to lost tracking of video extensometer at high elongation (>200%), the data at high elongation was not recorded.

API Extrusion Resistance

Figure 3:
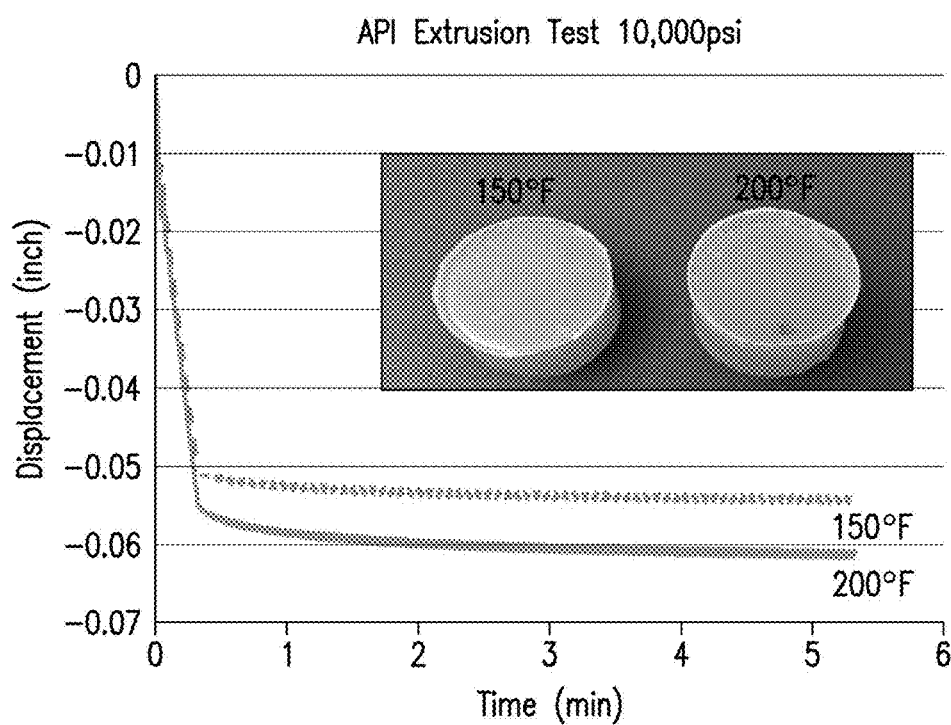
FIG. 3 shows API extrusion test results for the degradable polyurethane composite of example 1.

A pressure of 10,000 psi was applied to a test specimen of the polyurethane composite (ASTM buttons, 1.14"×0.5") within a test fixture of 0.00675" extrusion gap for 5 mins. The displacement kept steady, indicating good extrusion resistance. Due to the high strength and high elongation of this degradable polyurethane, it formed a continuous lip of extrusion, instead of shattering into powders or forming a pressed sample having the lip sheared off. The API extrusion tests results were summarized in FIG. 3.

Example 2

A degradable polyurethane composite was prepared from a polyurethane pre-polymer, a curative and a basic fine powder. A toluene diisocyanate (TDI)-terminated polyester-based polyurethane pre-polymer (ADIPRENE 1950A from Chemtura Corporation having NCO content as 5.45%, 120 grams) was pre-heated at 70° C. to form a low viscosity liquid. An aromatic diamine (1,3 propanediol bis-(4-aminobenzoate), VIBRACURE A157, 23.21 grams) was preheated at 130° C. to form a liquid. The diamine was added to the pre-polymer and mixed for 10 seconds. After the calcium oxide fine powder (21.5 grams) was added and mixed for 1 min, the mixture was poured into a mold for compression molding. A void-free molded part was obtained after curing in the mold at an elevated temperature.

Degradation Property

Figure 4:
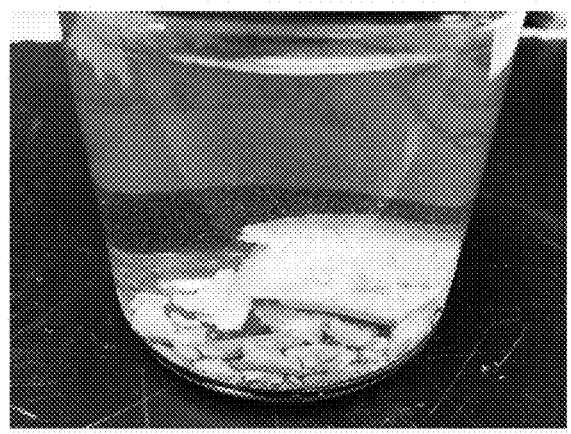
FIG. 4 shows degradation property of the degradable polyurethane composite of example 2.

The degradation property of the polyurethane composite is illustrated in FIG. 4. As shown in FIG. 4, the composite degraded into pieces within 1 day at 200° F.

Set forth below are various embodiments of the disclosure.

Embodiment 1

A degradable polymer composite comprising: a polyurethane comprising one or more of the following groups: ester groups; carbonate groups; or ether groups, in a backbone of the polyurethane; and about 1 to about 30 parts by weight of an acidic or basic powder comprising particles having an average size of about 5 microns to about 1 millimeter per 100 parts of the polyurethane.

Embodiment 2

The composite of Embodiment 1, wherein the powder is an acidic power comprising one or more of the following: citric acid; succinic acid; 2-acrylamide-2-methylpropane sulfonic acid; lignosulfonic acid; sulfamic acid; or adipic acid.

Embodiment 3

The composite of Embodiment 1, wherein the powder is a basic powder comprising one or more of the following: calcium oxide; calcium hydroxide; or glass powder.

Embodiment 4

The composite of any one of Embodiments 1 to 3, wherein the acidic or basic powder is present in an amount of about 5 to about 20 parts by weight based on 100 parts by weight of the polyurethane.

Embodiment 5

The composite of any one of Embodiments 1 to 4, wherein the acid or basic powder comprising particles having an average size of about 20 microns to about 500 microns.

Embodiment 6

The composite of any one of Embodiments 1 to 5, wherein the polyurethane is derived from a polyisocyanate and a polyol, wherein at least one of the polyisocyanate and the polyol comprise comprising one or more of the following groups: ester groups; carbonate groups; or ether groups.

Embodiment 7

The composite of any one of Embodiments 1 to 5, wherein the polyurethane is derived from a polyurethane prepolymer and a curative, the polyurethane prepolymer comprising one or more of the following groups: ester groups; carbonate groups; or ether groups.

Embodiment 8

The composite of Embodiment 7, wherein the polyurethane is derived from a toluene diisocyanate (TDI)-terminated polyester-based polyurethane pre-polymer and an aromatic diamine.

Embodiment 9

The composite of any one of Embodiments 1 to 8, wherein the weight ratio of the polyurethane to the filler is about 50:1 to about 1:1.

Embodiment 10

The composite of any one of Embodiments 1 to 9, wherein the composite degrades into pieces having a largest dimension of less than about two centimeters in about 2 days to about 2 weeks at a temperature greater than about 100° F. and lower than about 200° F. in water.

Embodiment 11

The composite of any one of Embodiments 1 to 9, wherein the composite degrades into pieces having a largest dimension of less than about two centimeters in about 4 days to about 10 days at a temperature greater than about 120° F. and lower than about 175° F. in water.

Embodiment 12

The composite of any one of Embodiments 1 to 11 having a tensile strength of about 3000 psi to about 8000 psi measured according to ASTM D412.

Embodiment 13

The composite of any one of Embodiments 1 to 12, having an elongation of greater than about 300%.

Embodiment 14

An article comprising the composite of any one of Embodiments 1 to 13.

Embodiment 15

The article of Embodiment 14, wherein the article is a pumpable tool comprising a plug, a direct connect plug, a bridge plug, a wiper plug, a frac plug, a component of a frac plug, a drill in sand control beaded screen plug, an inflow control device plug, a polymeric plug, a disappearing wiper plug, a cementing plug, a ball, a diverter ball, a shifting and setting ball, a swabbing element protector, a buoyant recorder, a pumpable collet, a float shoe, or a dart.

Embodiment 16

The article of Embodiment 14, wherein the article is a tool that inhibits flow comprising a seal, a high pressure beaded frac screen plug, a screen basepipe plug, a coating for a balls and a seat, a compression packing element, an expandable packing element, an O-ring, an attached seal, a bullet seal, a sub-surface safety valve seal, a sub-surface safety valve flapper seal, a dynamic seal, a V-ring, a backup ring, a drill bit seal, a liner port plug, an atmospheric disc, an atmospheric chamber disc, a debris barrier, a drill in stim liner plug, an inflow control device plug, a flapper, a seat, a ball seat, a direct connect disk, a drill-in linear disk, a gas lift valve plug, a fluid loss control flapper, an electric submersible pump seal, a shear out plug, a flapper valve, a gaslift valve, or a sleeve.

Embodiment 17

A method of manufacturing a degradable article, the method comprising: compressing a combination of an acidic or basic powder comprising particles having an average size of about 5 microns to about 1 millimeter and a polyurethane forming composition at a temperature of about 20° C. to about 150° C. and a pressure of about 100 psi to about 10,000 to provide a molded part; and heating the molded part at a temperature of about 60° C. to about 150° C. to provide the disintegrable article; wherein the polyurethane forming composition comprises a first composition comprising a polyol and a polyisocyanate, at least one of the polyisocyanate and the polyol comprising one or more of the following groups: ester groups; carbonate groups; or ether groups; or a second composition comprising a curative and a polyurethane prepolymer comprising one or more of the following groups: ester groups; carbonate groups; or ether groups.

Embodiment 18

A method to degrade an article, the method comprising: exposing the article to a fluid at a temperature of about 25° C. to about 300° C., the article comprising a polyurethane comprising one or more of the following groups: ester groups; carbonate groups; or ether groups, in a backbone of the polyurethane; and about 1 to about 30 parts by weight of an acidic or basic powder comprising particles having an average size of about 5 microns to about 1 millimeter per 100 parts of the polyurethane.

Embodiment 19

The method of Embodiment 18, wherein the article is exposed to the fluid at a pressure of about 100 psi to about 15,000 psi.

Embodiment 20

The method of Embodiment 18 or Embodiment 19, wherein the fluid comprises water or brine.

All ranges disclosed herein are inclusive of the endpoints, and the endpoints are independently combinable with each other. As used herein, "combination" is inclusive of blends, mixtures, alloys, reaction products, and the like. All references are incorporated herein by reference.

The use of the terms "a" and "an" and "the" and similar referents in the context of describing the invention (especially in the context of the following claims) are to be construed to cover both the singular and the plural, unless otherwise indicated herein or clearly contradicted by context. "Or" means "and/or." The modifier "about" used in connection with a quantity is inclusive of the stated value and has the meaning dictated by the context (e.g., it includes the degree of error associated with measurement of the particular quantity).

What is claimed is:

1. A degradable polymer composite comprising:
   a polyurethane comprising one or more of the following groups: ester groups; carbonate groups; or ether groups, in a backbone of the polyurethane; and
   about 1 to about 30 parts by weight of an acidic powder comprising sulfamic acid particles having an average size of about 5 microns to about 1 millimeter per 100 parts of the polyurethane,
   wherein the composite degrades into pieces having a largest dimension of less than about two centimeters in about 2 days to about 2 weeks at a temperature greater than about 100° F. and lower than about 200° F. in water.

2. The composite of claim 1, wherein the acidic powder is present in an amount of about 5 to about 20 parts by weight based on 100 parts by weight of the polyurethane.

3. The composite of claim 1, wherein the acid powder comprises particles having an average size of about 20 microns to about 500 microns.

4. The composite of claim 1, wherein the polyurethane is derived from a polyisocyanate and a polyol, wherein at least one of the polyisocyanate and the polyol comprise one or more of the following groups: ester groups; carbonate groups; or ether groups.

5. The composite of claim 1, wherein the polyurethane is derived from a polyurethane prepolymer and a curative, the polyurethane prepolymer comprising one or more of the following groups: ester groups; carbonate groups; or ether groups.

6. The composite of claim 5, wherein the polyurethane is derived from a toluene diisocyanate (TDI)-terminated polyester-based polyurethane pre-polymer and an aromatic diamine.

7. The composite of claim 1, wherein the weight ratio of the polyurethane to the acidic powder is about 10:1 to about 5:1.

8. The composite of claim 1, wherein the composite degrades into pieces having a largest dimension of less than about two centimeters in about 4 days to about 10 days at a temperature greater than about 120° F. and lower than about 175° F. in water.

9. The composite of claim 1 having a tensile strength of about 3000 psi to about 8000 psi measured according to ASTM D412.

10. The composite of claim 1, having an elongation of greater than about 300%.

11. An article comprising the composite of claim 1.

12. The article of claim 11, wherein the article is a pumpable tool comprising a plug, a direct connect plug, a bridge plug, a wiper plug, a frac plug, a component of a frac plug, a drill in sand control beaded screen plug, an inflow control device plug, a polymeric plug, a disappearing wiper plug, a cementing plug, a ball, a diverter ball, a shifting and setting ball, a swabbing element protector, a buoyant recorder, a pumpable collet, a float shoe, or a dart.

13. The article of claim 11, wherein the article is a tool that inhibits flow comprising a seal, a high pressure beaded frac screen plug, a screen basepipe plug, a coating for a balls and a seat, a compression packing element, an expandable packing element, an O-ring, an attached seal, a bullet seal, a sub-surface safety valve seal, a sub-surface safety valve flapper seal, a dynamic seal, a V-ring, a backup ring, a drill bit seal, a liner port plug, an atmospheric disc, an atmospheric chamber disc, a debris barrier, a drill in stim liner plug, an inflow control device plug, a flapper, a seat, a ball seat, a direct connect disk, a drill-in linear disk, a gas lift valve plug, a fluid loss control flapper, an electric submersible pump seal, a shear out plug, a flapper valve, a gaslift valve, or a sleeve.

14. A method of manufacturing a degradable article of claim 11, the method comprising:
   compressing a combination of the acidic powder comprising sulfamic acid particles having an average size of about 5 microns to about 1 millimeter and a polyurethane forming composition at a temperature of about 20° C. to about 150° C. and a pressure of about 100 psi to about 10,000 to provide a molded part; and
   heating the molded part at a temperature of about 60° C. to about 150° C. to provide the degradable article;
   wherein the polyurethane forming composition comprises a first composition comprising a polyol and a polyisocyanate, at least one of the polyisocyanate and the polyol comprising one or more of the following groups: ester groups; carbonate groups; or ether groups; or a second composition comprising a curative and a polyurethane prepolymer comprising one or more of the following groups: ester groups; carbonate groups; or ether groups.

15. A method to degrade an article, the method comprising:
   exposing an article to a fluid at a temperature of about 25° C. to about 300° C.,
   the article comprising the degradable polymer composite of claim 1.

16. The method of claim 15, wherein the article is exposed to the fluid at a pressure of about 100 psi to about 15,000 psi.

17. The method of claim 15, wherein the fluid comprises water or brine.

* * * * *